(12) United States Patent
Engstrom

(10) Patent No.: US 8,516,767 B2
(45) Date of Patent: Aug. 27, 2013

(54) JOINT FOR PANELS

(75) Inventor: Nils-Erik Engstrom, Trelleborg (SE)

(73) Assignee: Pergo (Europe) AB, Trelleborg (SE)

( * ) Notice: Subject to any disclaimer, the term of this patent is extended or adjusted under 35 U.S.C. 154(b) by 2024 days.

(21) Appl. No.: 11/242,127

(22) Filed: Oct. 4, 2005

(65) Prior Publication Data

US 2007/0006543 A1    Jan. 11, 2007

(30) Foreign Application Priority Data

Jul. 11, 2005   (SE) ...................................... 05016399

(51) Int. Cl.
*E04B 2/00*   (2006.01)

(52) U.S. Cl.
USPC .......................... 52/591.1; 52/586.1; 52/592.1

(58) Field of Classification Search
USPC ........... 52/396.04, 396.1, 582.1, 586.2, 592.2
See application file for complete search history.

(56) References Cited

U.S. PATENT DOCUMENTS

| | | | |
|---|---|---|---|
| 714,987 A | 12/1902 | Wolfe | |
| 2,004,193 A * | 6/1935 | Cherry | 52/506.1 |
| 2,740,167 A | 4/1956 | Rowley | |
| 3,444,660 A | 5/1969 | Feichter | |
| 3,479,784 A | 11/1969 | Massagli | |
| 3,553,919 A | 1/1971 | Omholt | |
| 3,572,224 A * | 3/1971 | Perry | 404/40 |
| 3,720,027 A | 3/1973 | Christensen | |
| 3,731,445 A | 5/1973 | Hoffmann | |
| 3,798,111 A | 3/1974 | Lane | |
| 3,807,113 A | 4/1974 | Turner | |
| 3,859,000 A | 1/1975 | Webster | |
| 3,921,312 A | 11/1975 | Fuller | |
| 4,144,689 A * | 3/1979 | Bains | 52/285.1 |
| 4,426,820 A * | 1/1984 | Terbrack et al. | 52/590.1 |
| 4,449,346 A | 5/1984 | Tremblay | |
| 4,905,442 A * | 3/1990 | Daniels | 52/588.1 |
| 4,940,503 A | 7/1990 | Lindgren | |
| 5,092,095 A | 3/1992 | Zadok | |

(Continued)

FOREIGN PATENT DOCUMENTS

| | | |
|---|---|---|
| BE | 1010487 A6 | 12/1999 |
| DE | 1985418 | 5/1968 |

(Continued)

OTHER PUBLICATIONS

Pending U.S. Appl. No. 09/672,077.

(Continued)

*Primary Examiner* — Jessica Laux
(74) *Attorney, Agent, or Firm* — Novak Druce Connolly Bove + Quigg LLP

(57) ABSTRACT

A joint (1) having a first edge (2) and a second edge (3), the first edge (2) being provided with a distal edge (21) and a downwards protruding heel (22) The distal edge (21) is further provided with an upper joint edge (25) beneath which a groove (23) is arranged. The second edge (3) is provided with lower cheek (31) having a distal end (32) at which an upwards protruding lower cheek heel (33) is arranged. The second edge (3) is further provided with an upper joining edge (35) beneath which an undercut (34) is arranged. A moveable locking element (40) is arranged in the space created by the undercut (34). The moveable locking element (40) have a locking tongue (41), a locking tongue leg (42) and a maneuvering leg (43).

15 Claims, 10 Drawing Sheets

(56) References Cited

U.S. PATENT DOCUMENTS

Figure 1A:
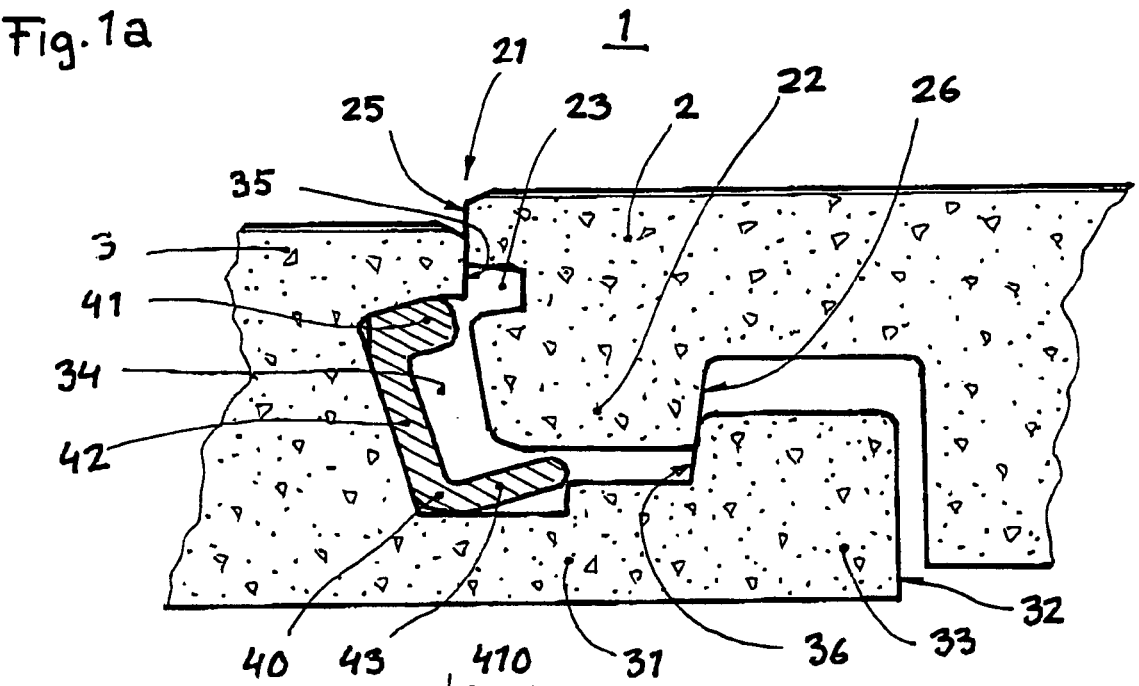

| | | | |
|---|---|---|---|
| 5,117,603 A | 6/1992 | Weintraub | |
| 5,148,850 A | 9/1992 | Urbanick | |
| 5,216,861 A | 6/1993 | Meyerson | |
| 5,274,979 A | 1/1994 | Tsai | |
| 5,295,341 A | 3/1994 | Kajiwara | |
| 5,325,649 A | 7/1994 | Kajiwara | |
| 5,344,700 A | 9/1994 | McGath | |
| 5,348,778 A | 9/1994 | Knipp | |
| 5,502,939 A | 4/1996 | Zadok | |
| 5,527,128 A | 6/1996 | Rope et al. | |
| 5,630,304 A | 5/1997 | Austin | |
| 5,685,117 A * | 11/1997 | Nicholson | 52/520 |
| 5,706,621 A | 1/1998 | Pervan | |
| 5,791,114 A | 8/1998 | Mandel | |
| 5,797,237 A | 8/1998 | Finkell | |
| 5,860,267 A | 1/1999 | Pervan | |
| 5,907,934 A | 6/1999 | Austin | |
| 5,971,655 A | 10/1999 | Shirakawa | |
| 6,006,486 A * | 12/1999 | Moriau et al. | 52/589.1 |
| 6,023,907 A * | 2/2000 | Pervan | 52/748.1 |
| 6,094,882 A | 8/2000 | Pervan | |
| 6,101,778 A * | 8/2000 | Martensson | 52/582.1 |
| 6,182,410 B1 | 2/2001 | Pervan | |
| 6,205,639 B1 | 3/2001 | Pervan | |
| 6,209,278 B1 * | 4/2001 | Tychsen | 52/592.4 |
| 6,216,409 B1 | 4/2001 | Roy | |
| 6,314,701 B1 * | 11/2001 | Meyerson | 52/588.1 |
| 6,324,803 B1 | 12/2001 | Pervan | |
| 6,397,547 B1 | 6/2002 | Martensson | |
| 6,418,683 B1 | 7/2002 | Martensson | |
| 6,421,970 B1 | 7/2002 | Martensson | |
| 6,438,919 B1 | 8/2002 | Knauseder | |
| 6,591,568 B1 * | 7/2003 | Palsson | 52/592.2 |
| 6,647,690 B1 * | 11/2003 | Martensson | 52/601 |
| 6,763,643 B1 * | 7/2004 | Martensson | 52/586.1 |
| 6,769,835 B2 * | 8/2004 | Stridsman | 404/41 |
| 6,854,235 B2 * | 2/2005 | Martensson | 52/601 |
| 6,966,161 B2 * | 11/2005 | Palsson et al. | 52/589.1 |
| 2004/0139678 A1 * | 7/2004 | Pervan | 52/578 |
| 2004/0211143 A1 * | 10/2004 | Hanning | 52/578 |
| 2007/0028547 A1 * | 2/2007 | Grafenauer et al. | 52/586.1 |
| 2008/0000186 A1 | 1/2008 | Pervan et al. | |

FOREIGN PATENT DOCUMENTS

| | | |
|---|---|---|
| DE | 2159042 | 6/1973 |
| DE | 2238660 | 2/1974 |
| DE | 3343601 A1 | 2/1974 |
| DE | 2251762 | 5/1974 |
| DE | 2502992 | 7/1976 |
| DE | 9300306.4 | 3/1993 |
| EP | 0085196 | 8/1983 |
| FR | 1175582 | 3/1959 |
| GB | 812671 | 4/1959 |
| GB | 1348272 | 3/1974 |
| GB | 1430423 | 3/1976 |
| GB | 2256023 A | 11/1992 |
| JP | 6414839 | 1/1989 |
| JP | 64014838 | 1/1989 |
| JP | 3018343 | 2/1991 |
| JP | 3046645 | 4/1991 |
| JP | 3169967 | 7/1991 |
| SE | 501014 | 10/1994 |
| SE | 502994 | 3/1996 |
| WO | 9313280 | 7/1993 |
| WO | WO 9313280 A1 * | 7/1993 |
| WO | WO96/27719 | 9/1996 |
| WO | 9747834 | 12/1997 |
| WO | 9966151 | 12/1999 |
| WO | 0063510 | 10/2000 |
| WO | WO2006/043893 | 4/2006 |
| WO | WO2008/004960 A2 | 1/2008 |

OTHER PUBLICATIONS

Pending U.S. Appl. No. 09/988,014.
Pending U.S. Appl. No. 09/770,395.
Pending U.S. Appl. No. 10/158,945.
Pending U.S. Appl. No. 09/672,076.
U.S. Appl. No. 60/869,181, Pervan.

* cited by examiner

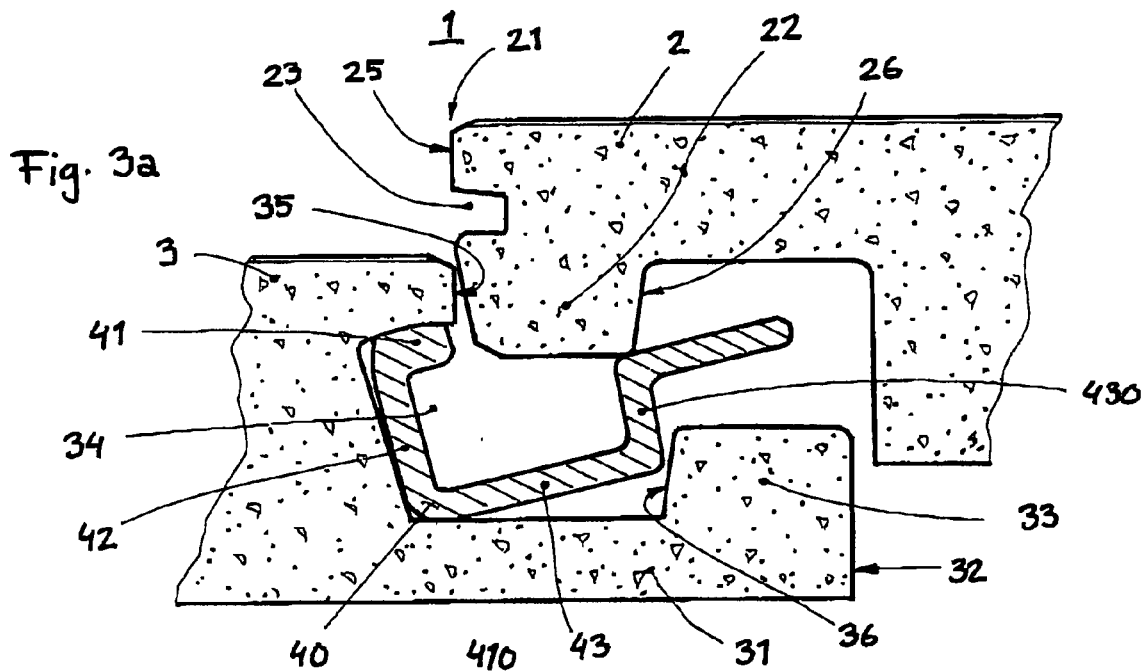
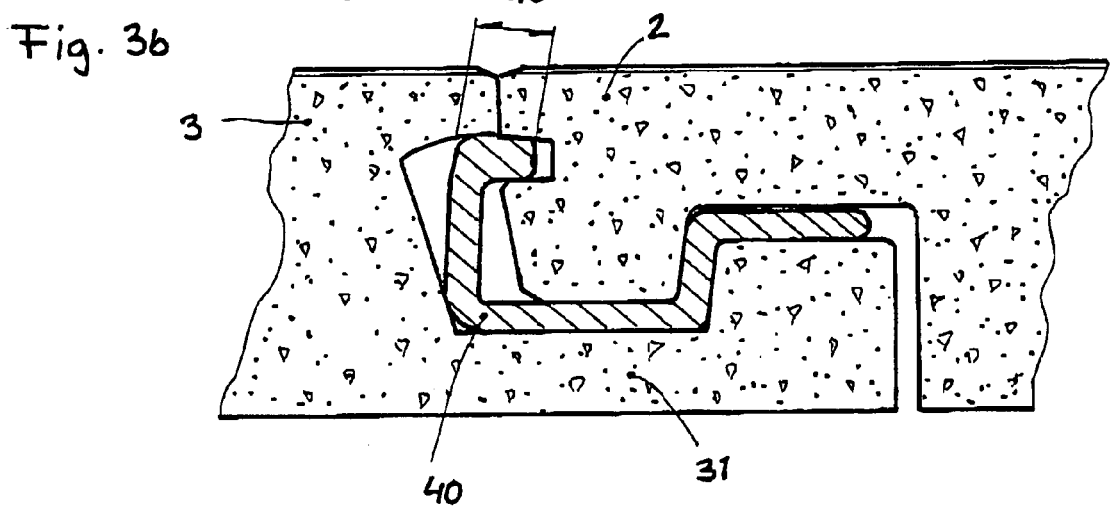

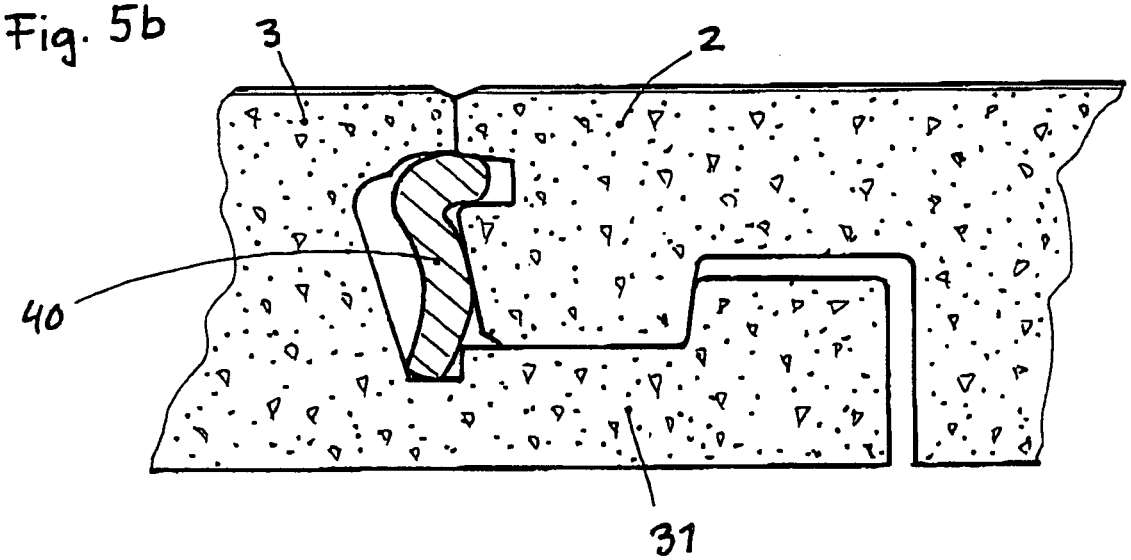

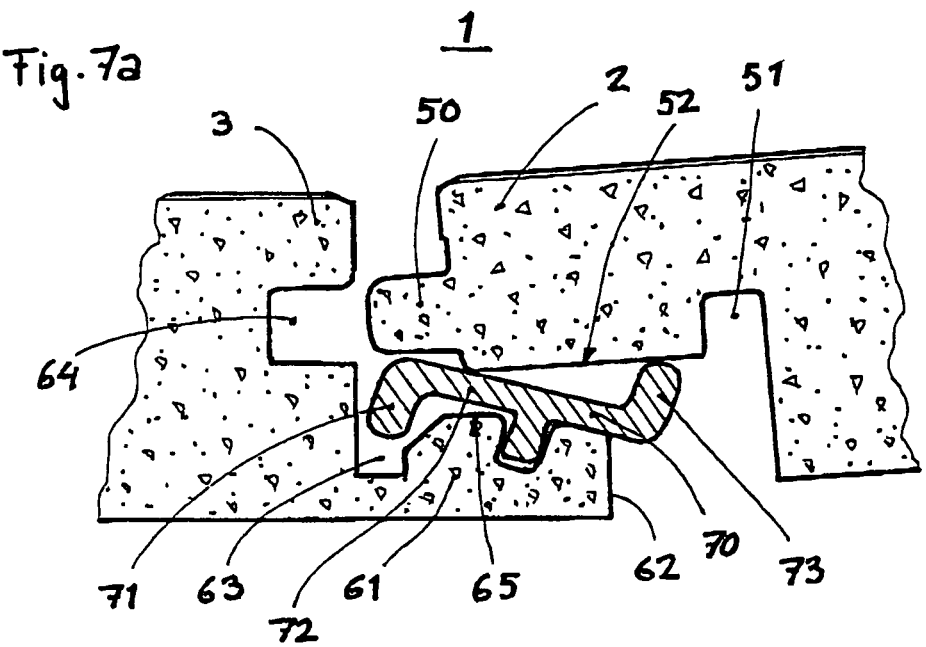
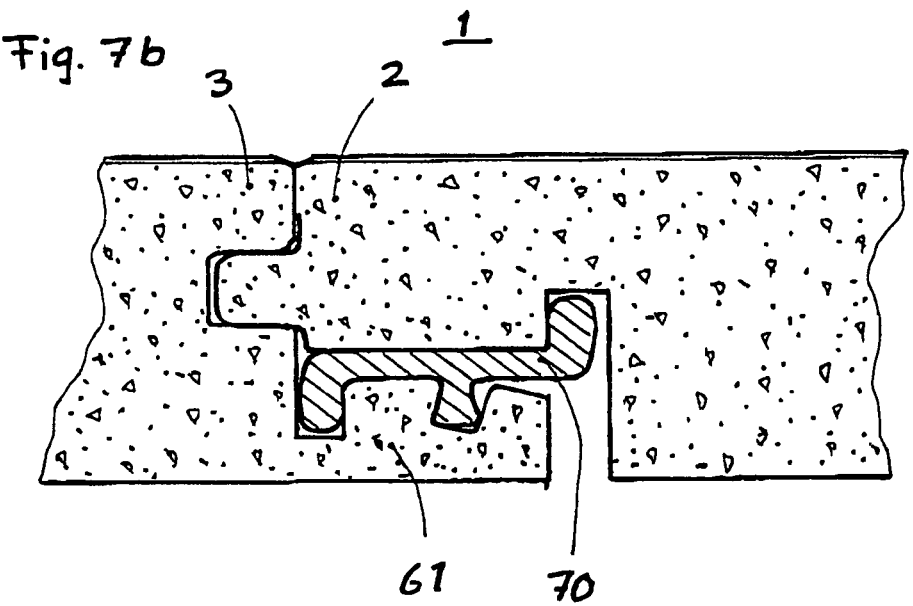

JOINT FOR PANELS

BACKGROUND OF THE INVENTION

1. Field of the Invention

The present invention relates to a joint used for connecting panels.

2. Description of Related Prior Art

Prefabricated floor boards provided with tongue and groove at the edges are quite common nowadays. These can be installed by the average handy man as they are very easy to install. Such floors can, for example, be constituted of solid wood, fibre board or particle board. These are most often provided with a surface layer such as lacquer, or some kind of laminate. The boards are most often installed by being glued via tongue and groove. The most common types of tongue and groove are however burdened with the disadvantage to form gaps of varying width between the floor boards in cases where the installer hasn't been thorough enough. Dirt will easily collect in such gaps. Moisture will furthermore enter the gaps which will cause the core to expand in cases where it is made of wood, fibre board or particle board, which usually is the case. The expansion will cause the surface layer to rise closest to the edges of the joint which radically reduces the useful life of the floor since the surface layer will be exposed to an exceptional wear. Different types of tensioning devices, forcing the floor boards together during installation can be used to avoid such gaps. This operation is however more or less awkward. It is therefore desirable to achieve a joint which is self-guiding and thereby automatically finds the correct position. Such a joint would also be possible to utilize in floors where no glue is to be used. Different types of joint with mechanical locking have been made available. These are commonly known as click joints or snap-action joints and they rely on resilient action in upper and/or lower cheeks of the groove portion of the joint. It is very common to use fibre board or particle board as core material and the resilient properties of these materials are somewhat limited. It is therefore the object of the present invention to work around the problem by not completely relying on the limited resiliency allowed by the core material.

SUMMARY OF THE INVENTION

It has, through the present invention, been made possible to improve the assembly procedure as well as achieving an improved locking between panels. Accordingly, the invention relates to a joint having a first edge and a second edge. The first edge is provided with a distal edge and a downwards protruding heel. The distal edge is further provided with an upper joint edge beneath which a groove is arranged. The second edge is provided with lower cheek having a distal end at which an upwards protruding lower cheek heel is arranged. The second edge is further provided with an upper joining edge beneath which an undercut is arranged. The invention is characterized in a moveable locking element is arranged in the space created by the undercut. The moveable locking element has a locking tongue, a locking tongue leg and a maneuvering leg. The second edge is intended to join with the first edge through vertical motion. The moveable locking element, or more precisely the locking tongue of the locking element, will be displaced by the vertical motion when the two edges are moved towards each other. The displacement can be seen as a rotation where the locking tongue is brought to rotate around a selected pivot point. Resilient action may also realize this rotating action.

According to a preferred embodiment of the invention the downwards protruding heel presses on the maneuvering leg, thereby urging the locking tongue to move forward and engage the groove. An upper locking surface of the locking tongue is suitably longer than the portion of the locking tongue that can engage the groove.

The lower cheek heel suitably has a front face and that the downwards protruding heel has a rear face. The front face and the rear face are then preferably intended to interact, the interaction resulting in the upper joint edge and the upper joining edge being urged together in an assembled joint.

According to one alternative embodiment of the invention, the lower cheek heel suitably has a front face and the downwards protruding heel has a rear face while the maneuvering leg has a face section. The front face and the rear face are then preferably intended to interact, having the face section in an intermediate position, the interaction resulting in the upper joint edge and the upper joining edge being urged together in an assembled joint.

According to one special embodiment of the inventions the locking element is provided with a hinge. This will allow a snap-action cam lock effect.

A moveable locking element like described in the present invention may suitably be made through extrusion moulding and it can be made of thermoplastic material, thermosetting material or even of metal.

The invention also relates to a joint having a first edge and a second edge where the first edge is provided with a tongue and a rear groove. The second edge is provided with a lower cheek having a distal end, an inner locking groove, a tongue groove and a locking member surface. The invention is characterized in a moveable locking member is arranged on the locking member surface. The moveable locking member has an inner locking tongue, a maneuvering cheek and an outer locking tongue. The second edge is intended to join with the first edge through horizontal motion.

Suitably, a maneuvering area beneath the tongue presses on the maneuvering cheek urging the inner locking tongue to move downwards and engage the inner locking groove. The maneuvering area beneath the tongue suitably presses on the maneuvering cheek also urging the outer locking tongue to move upwards and engage the rear groove.

A moveable locking element like described in the present invention may suitably be made through extrusion moulding and it can be made of thermoplastic material, thermosetting material, a composite material or even of metal.

The joint of the present invention is suitably used on products such as floor panels or wall panels. According to an embodiment of a floor panel according to the present invention includes a core which is covered with an upper decorative surface. The core most often consists of wood particles or fibre bonded together with glue or resin. Such core boards are commonly known as Medium Density Fibre board (MDF), High Density Fibre board (HDF), Oriented Strand Board (OSB) or particle board. It is, however, also possible to utilize the invention on cores made of solid wood. Since wood based core materials are sensitive to moisture, it may be advantageous to treat the area closest to the joint if the floor is to be exposed to moisture. This treatment may suitably include resin, wax or some kind of lacquer. It will not be necessary to treat the joint if the panels are to be glued since the glue itself will protect the joint from moisture penetration. The decorative upper surface may consist of a decorative paper possibly impregnated with melamine-formaldehyde resin. One or more layers of so called overlay paper of cellulose, impregnated with melamine-formaldehyde resin are suitably placed on top of the decorative paper. One or more of the above layers may be sprinkled with hard particles of, for example, aluminium oxide, silicon carbide or silicon oxide in connection to the impregnation in order to improve the abrasion resistance. The paper impregnated with resin is cured before, or in connection to, applying it to the core. The paper layers are suitably laminated together before they are applied to the core in cases where the upper decorative surface is constituted by more than one paper layers. The lower side may suitably be coated with a lacquer or a resin impregnated paper. It is also possible to arrange an impregnated support paper between the decor and the core.

Among possible upper surfaces to apply to the core may be mentioned;

Thermosetting laminates including at least a decorative paper impregnated with melamine-formaldehyde resin. Overlay paper and hard particles may be added to this as described earlier in the present application.

The upper decorative surface may also be constituted by an acrylic foil, an acrylic lacquer and combinations thereof It might also be constituted by a foil or a lacquer of poly olefins or poly olefin derivatives.

It is also possible to coat a decorative surface with an acrylic lacquer containing, or being sprinkled with, hard particles of α-aluminium oxide, silicon carbide or silicon oxide. The coating is most often achieved through use of a roller or through curtain coating. Among suitable acrylic lacquers can be mentioned radiation curing ones which are cured with electron beam or ultraviolet light forming free radicals in the uncured lacquer.

It is further possible to use wood veneer, most often coated with oil, wax or lacquer.

It has also shown that joints according to the present invention are well suited for other materials as well. It is, for example, possible to use the present invention on cores made of mineral based materials such as stone like marble, granite, slate, diabase, sandstone, limestone and the like but also ceramic, ceramic-like or composite materials like brick, concrete, fibre cement, glazed and non-glazed ceramic tiles. Some of these materials may be polished as the only surface treatment while glazing, painting or oil treatment is an example of other surface treatments possible to utilize on above mentioned core materials. It is of course also possible, as described together with wood based core materials, to arrange thermosetting laminates including at least a decorative paper impregnated with melamine-formaldehyde resin. Overlay paper and hard particles may be added to this as described earlier in the present application. The upper decorative surface may also be constituted by an acrylic foil, an acrylic lacquer and combinations thereof. It might also be constituted by a foil or a lacquer of poly olefins or poly olefin derivatives.

DETAILED DESCRIPTION OF EMBODIMENT EXAMPLES

Figure 1B:
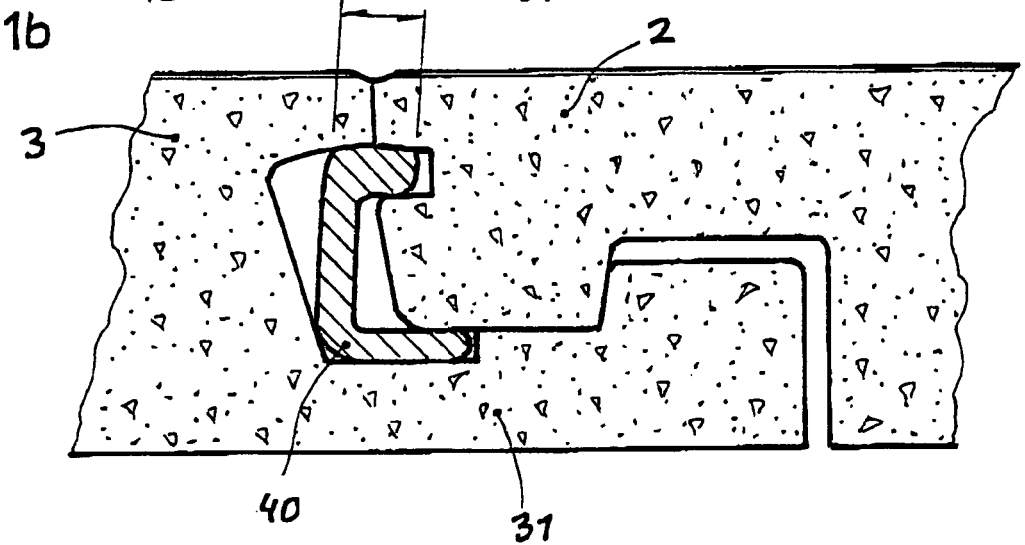

The invention is further described together with drawing showing different embodiments of the invention whereby, FIG. 1*a-b* shows a first embodiment of a joint 1 according to the invention.

Figure 2A:
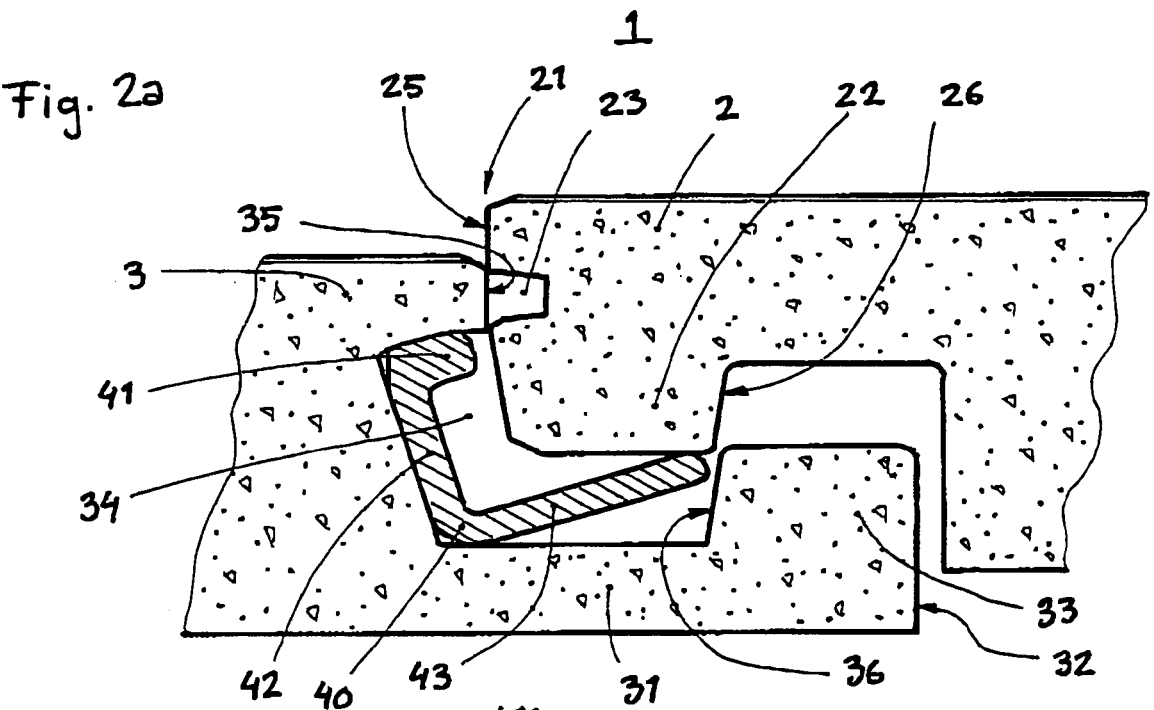
Figure 2B:
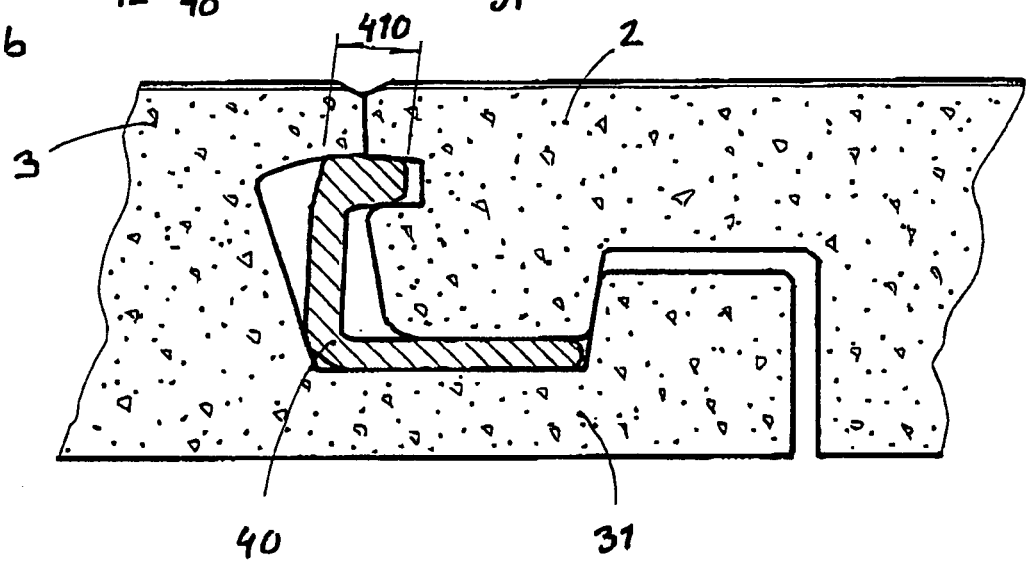

FIG. 2*a-b* shows a second embodiment of a joint 1 according to the invention.

FIG. 3*a-b* shows a third embodiment of a joint 1 according to the invention.

Figure 4A:
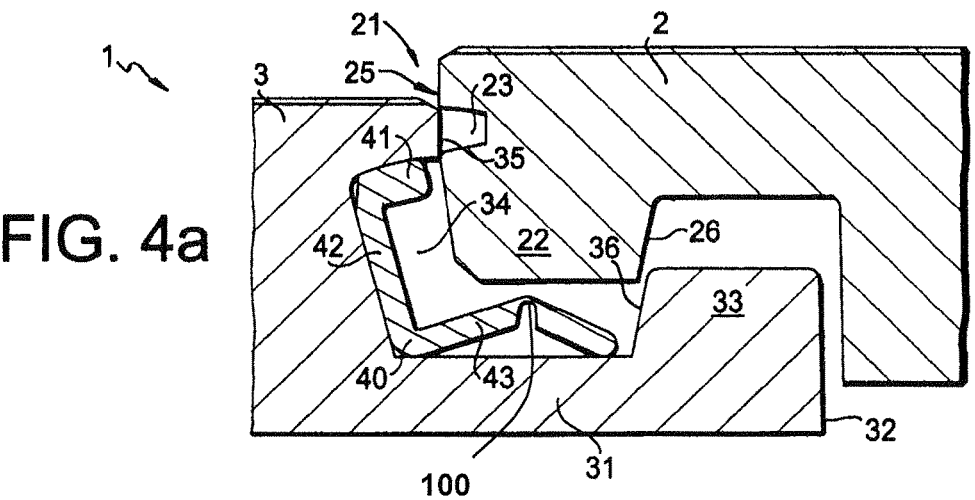
Figure 4B:
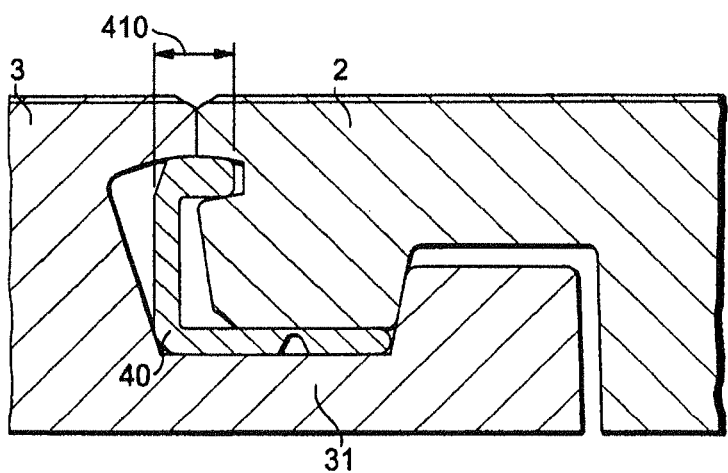

FIG. 4*a-b* shows a fourth embodiment of a joint 1 according to the invention.

Figure 5A:
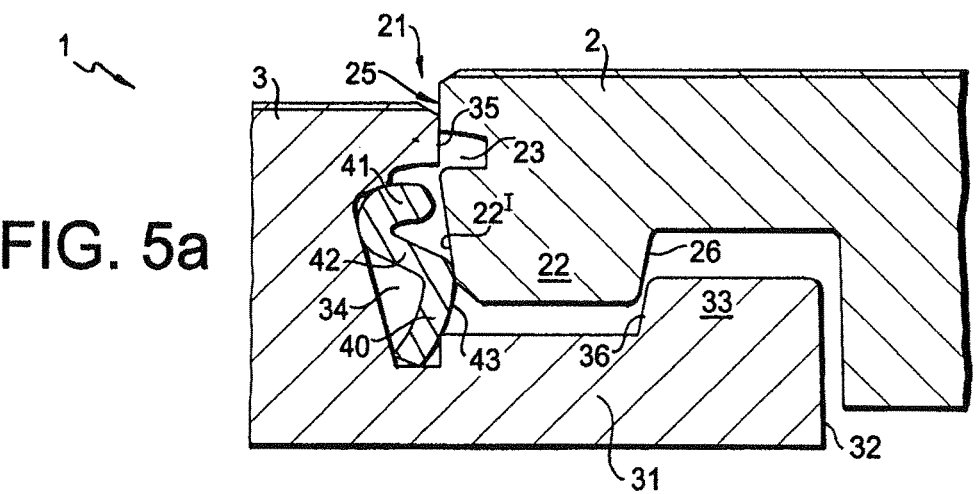

FIG. 5*a-b* shows a fifth embodiment of a joint 1 according to the invention.

Figure 6A:
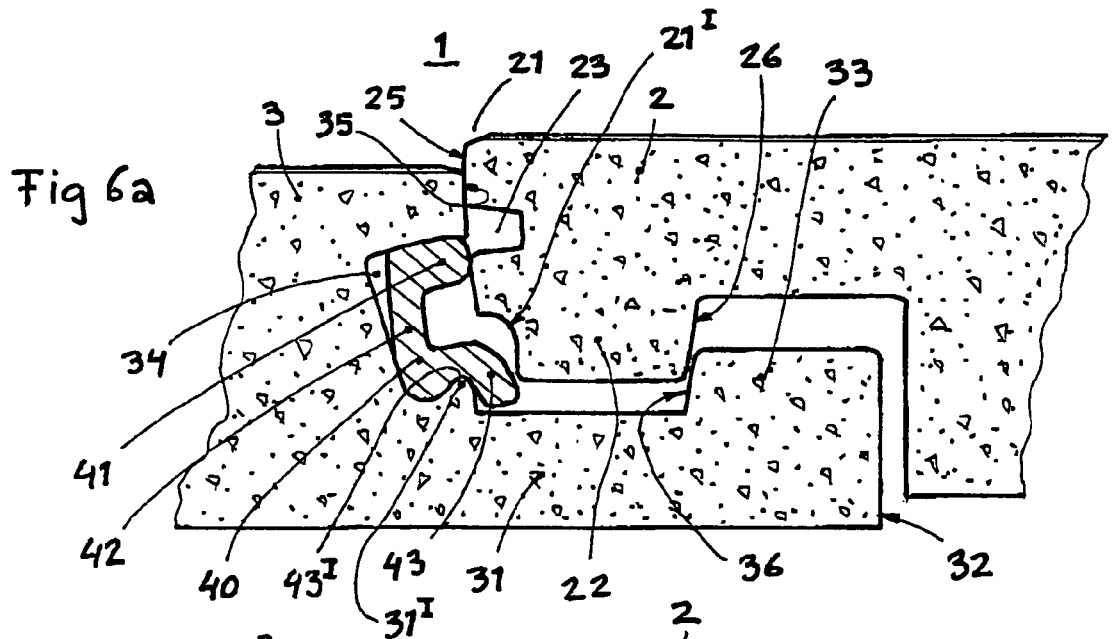
Figure 6B:
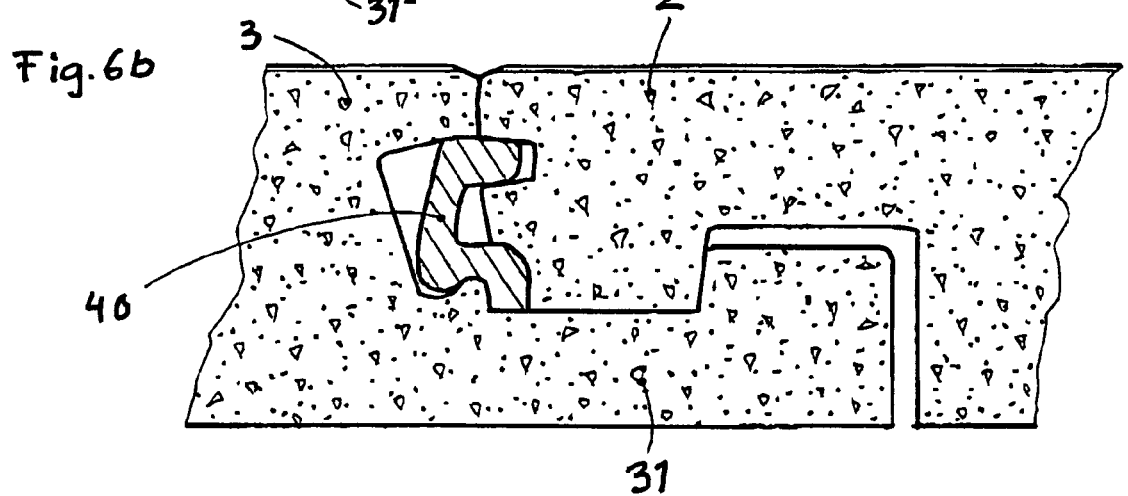

FIG. 6*a-b* shows a sixth embodiment of a joint 1 according to the invention.

Figure 6C:
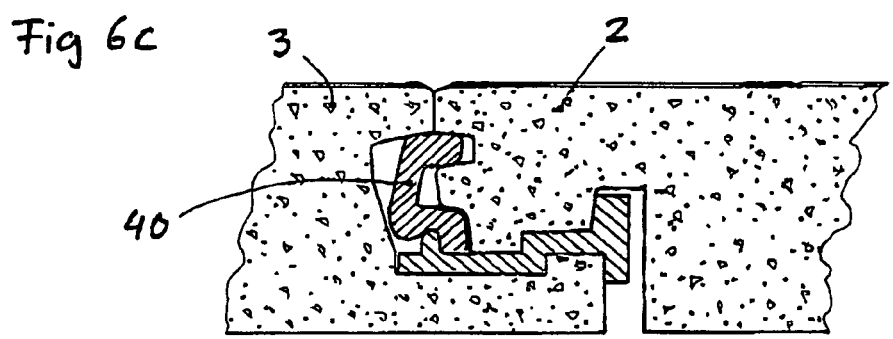

FIG. 6*c* shows an alternative version of the sixth embodiment shown in FIG. 6*a-b* of a joint 1 according to the invention FIG. 7*a-b* shows a seventh embodiment of a joint 1 according to the invention.

Figure 8A:
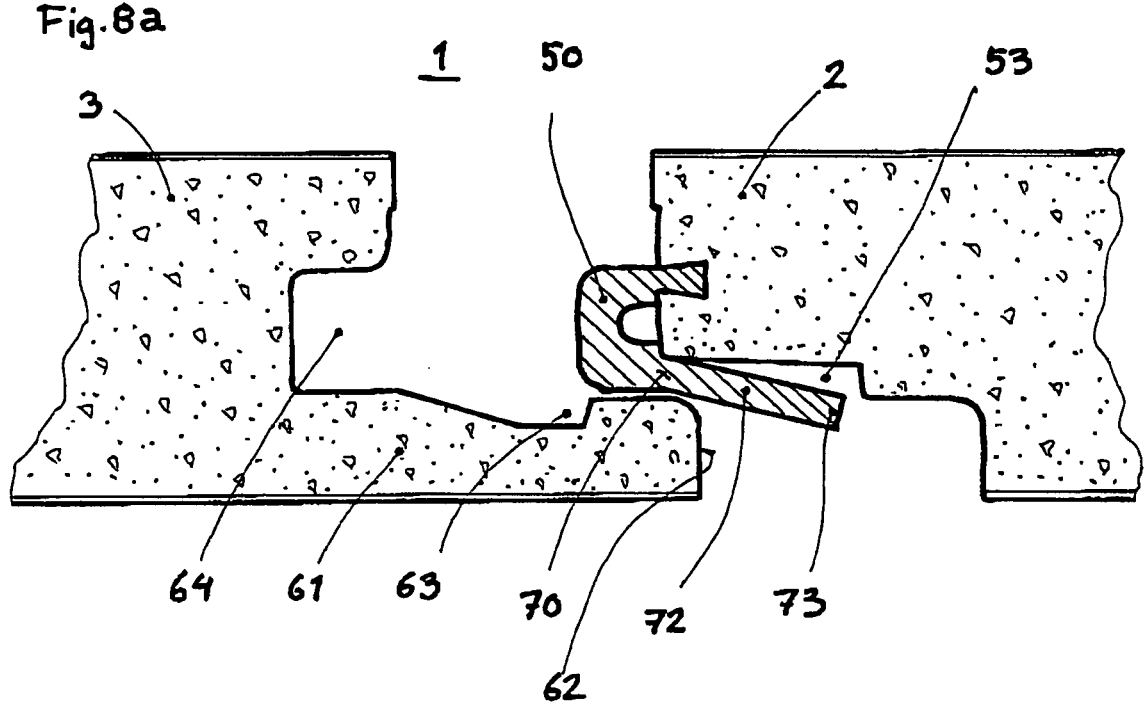
Figure 8B:
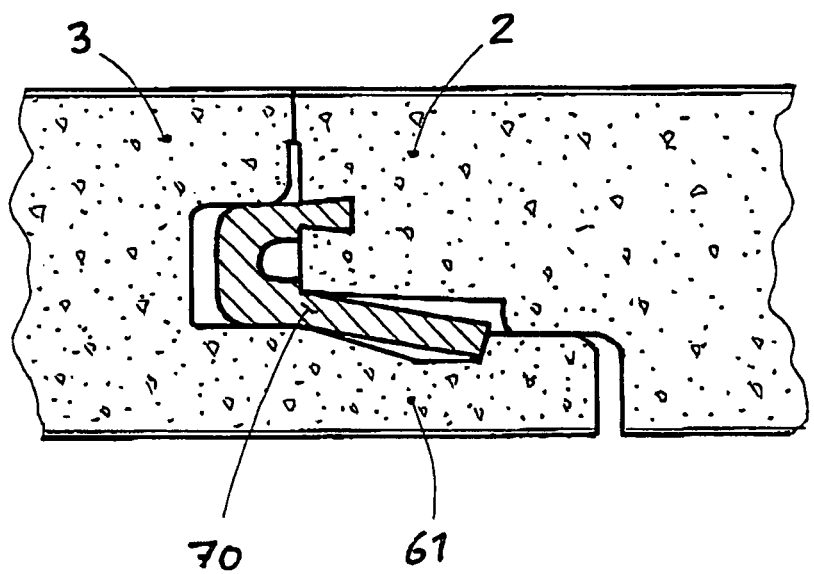

FIG. 8*a-b* shows a eighth embodiment of a joint 1 according to the invention.

Figure 9:
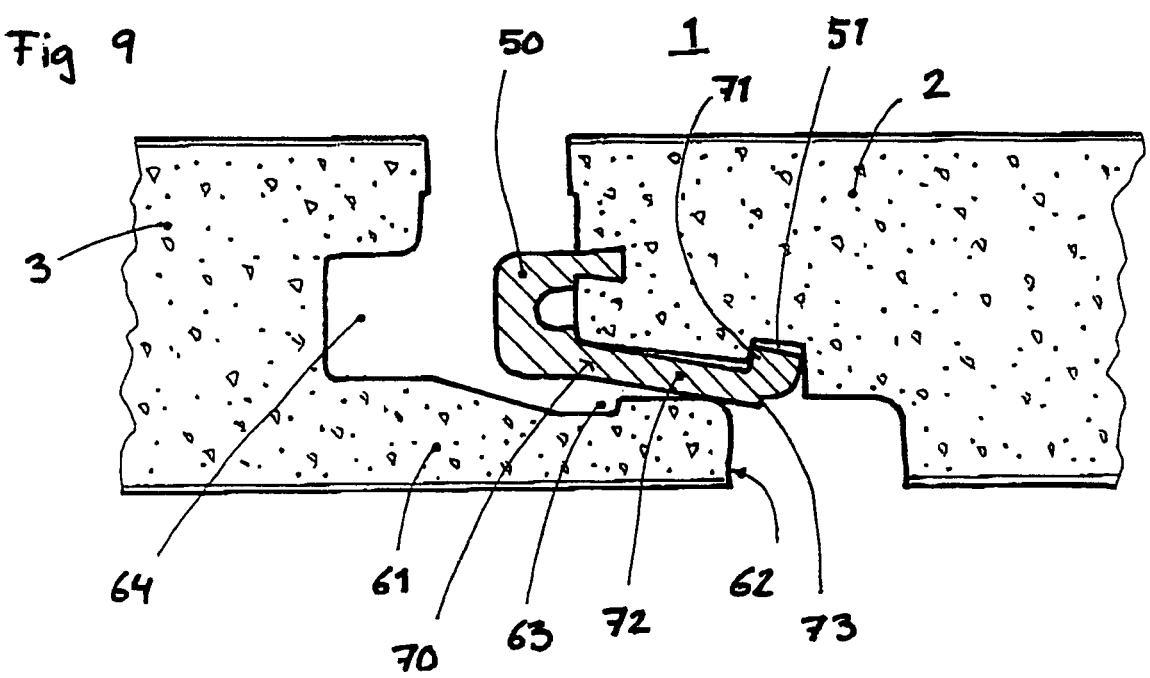

FIG. 9 shows a ninth embodiment of a joint 1 according to the invention.

Figure 10A:
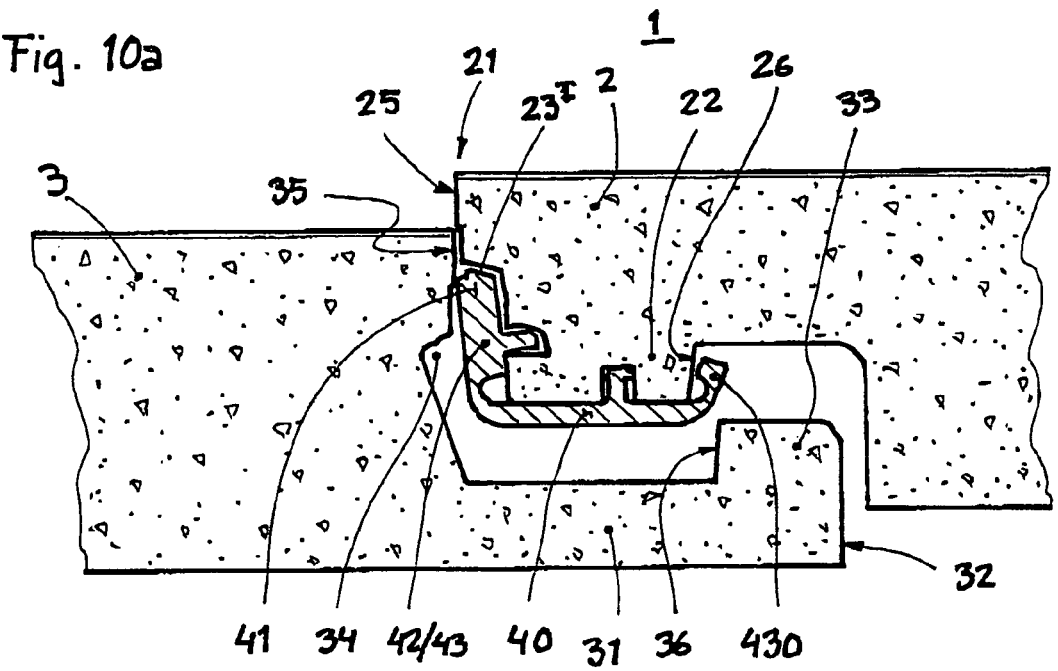
Figure 10B:
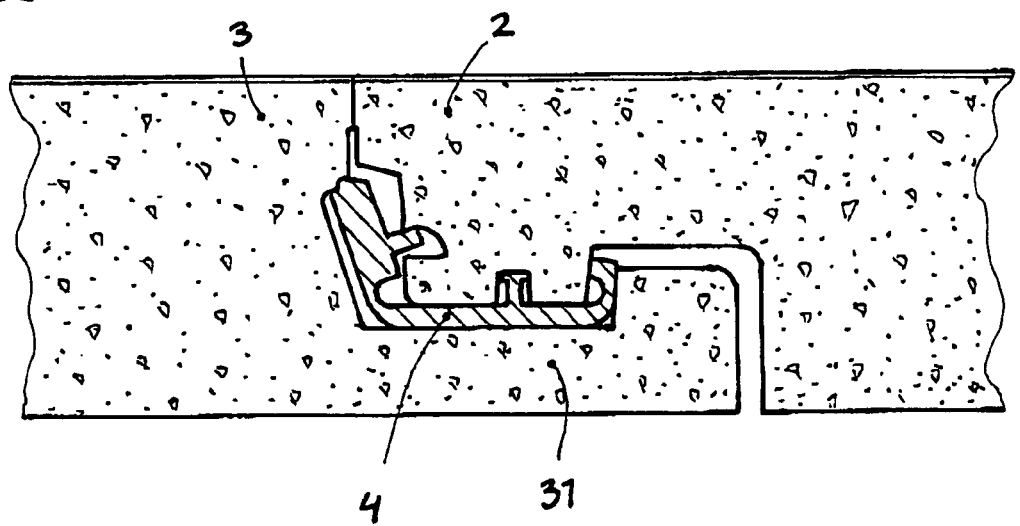

FIG. 10*a-b* shows a tenth embodiment of a joint 1 according to the invention.

Accordingly, FIG. 1*a-b* shows in cross-section a joint 1 having a first edge 2 and a second edge 3 according to a first embodiment of the invention. FIG. 1*a* shows the joint 1 just before the joining and FIG. 1*b* shows the joint 1 after assembly. The first edge 2 is provided with a distal edge 21 and a downwards protruding heel 22. The distal edge 21 is further provided with an upper joint edge 25 beneath which a groove 23 is arranged. The second edge 3 is provided with a lower check 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 has a locking tongue 41, a locking tongue leg 42 and a maneuvering leg 43. The second edge 3 is intended to join with the first edge 2 through vertical motion. The downwards protruding heel 22 hereby presses on the maneuvering leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 has a front face 36 while the downwards protruding heel 22 has a rear face 26. The front face 36 and the rear face 26 are intended to interact which is resulting in the upper joint edge 25 and the upper joining edge 35 being urged together in an assembled joint 1.

FIG. 2*a-b* shows, in cross-section, a joint 1 having a first edge 2 and a second edge 3 according to a second embodiment of the invention. FIG. 2*a* shows the joint 1 just before the joining and FIG. 2*b* shows the joint 1 after assembly. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 has a locking tongue 41, a locking tongue leg 42 and a maneuvering leg 43. The second edge 3 is intended to join with the first edge 2 through vertical motion. The maneuvering leg 43 is here extended to increase the locking force. The downwards protruding heel 22 hereby presses on the maneuvering leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 has a front face 36 while the downwards protruding heel 22 has a rear face 26. The front face 36 and the rear face 26 are intended to interact which is resulting in the upper joint edge 25 and the upper joining edge 35 being urged together in an assembled joint 1.

FIG. 3a-b shows, in cross-section, a joint 1 having a first edge 2 and a second edge 3 according to a third embodiment of the invention. FIG. 3a shows the joint 1 just before the joining and FIG. 3b shows the joint 1 after assembly. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 has a locking tongue 41, a locking tongue leg 42 and a maneuvering leg 43. The second edge 3 is intended to join with the first edge 2 through vertical motion. The maneuvering leg 43 is here extended further to increase the locking force. The downwards protruding heel 22 hereby presses on the maneuvering leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 has a front face 36 while the downwards protruding heel 22 has a rear face 26. The lower cheek heel 33 has a front face 36 while the downwards protruding heel 22 has a rear face 26 and the maneuvering leg has a face section 430. The front face 36 and the rear face 26 are intended to interact, having the face section 430 in an intermediate position. The interaction results in the upper joint edge 25 and the upper joining edge 35 being urged together in an assembled joint 1.

FIG. 4a-b shows in cross-section a joint 1 having a first edge 2 and a second edge 3 according to a fourth embodiment of the invention. FIG. 4a shows the joint 1 just before the joining and FIG. 4b shows the joint 1 after assembly. The first edge 2 is provided with a distal edge 21 and a downwards protruding heel 22. The distal edge 21 is further provided with an upper joint 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 have a locking tongue 41, a locking tongue leg 42 and a maneuvering leg 43. The second edge 3 is intended to join with the first edge 2 through vertical motion. The maneuvering leg 43 is provided with a hinge 100 which allows a cam lock effect. The downwards protruding heel 22 hereby presses on he maneuvering leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 has a front face 36 while the downwards protruding heel 22 has a rear face 26. The front face 36 and the rear face 26 are intended to interact which is resulting in the upper joint edge 25 and the upper joining edge 35 being urged together in an assembled joint 1.

FIG. 5a-b shows in cross-section a joint 1 having a first edge 2 and a second edge 3 according to a fifth embodiment of the invention. FIG. 5a shows the joint 1 just before the joining and FIG. 5b shows the joint 1 after assembly. The fifth embodiment is an alternative embodiment of the invention. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 has a locking tongue 41, a locking tongue leg 42 and a maneuvering leg 43. The second edge 3 is intended to join with the first edge 2 through vertical motion.

A front surface 22' of the downwards protruding heel 22 hereby presses on the maneuvering leg 43 urging the bent maneuvering leg 43 to straighten whereby the locking tongue 41 moves forward and engage the groove 23. The lower cheek heel 33 has a front face 36 while the downwards protruding heel 22 has a rear face 26. The front face 36 and the rear face 26 are intended to interact which is resulting in the upper joint edge 25 and the upper joining edge 35 being urged together in an assembled joint 1.

FIG. 6a-b shows in cross-section a joint 1 having a first edge 2 and a second edge 3 according to a sixth embodiment of the invention. FIG. 6a shows the joint 1 just before the joining and FIG. 6b shows the joint 1 after assembly. FIG. 6c shows an alternative embodiment of the embodiment shown in FIG. 6a-b. Beginning with FIG. 6a-b, the first edge 2 is provided with a distal edge 21 and a downwards protruding heel 22. The distal edge 21 is further provided with an upper joint edge 25 beneath which a groove 23 is arranged. The second edge 3 is provided with a lower check 31 having a distal end 32 at which an upwards protruding lower check heel 33 is arranged. The second edge 3 is further provided with an upper joining edge 35 beneath which an undercut 34 is arranged. A moveable locking element 40 is arranged in the space created by the undercut 34. The moveable locking element 40 has a locking tongue 41, a locking tongue leg 42 and a maneuvering leg 43. The moveable locking element 40 is further provided with a pivot groove $43^I$. The lower cheek 31 is provided with a pivot edge $31^I$. The pivot groove $43^I$ and the pivot edge $31^I$ are intended to interact. The second edge 3 is intended to join with the first edge 2 through vertical motion.

A front surface $22^I$ of the downwards protruding heel 22 hereby presses on the maneuvering leg 43 urging the maneuvering leg 43 to tilt with the pivot edge $31^I$ as an axis of rotation whereby the locking tongue 41 moves forward and engage the groove 23. The lower cheek heel 33 has a front face 36 while the downwards protruding heel 22 has a rear face 26. The front face 36 and the rear face 26 are intended to interact which is resulting in the upper joint edge 25 and the upper joining edge 35 being urged together in an assembled joint 1. The lower cheek 31, the downwards protruding heal 22 and the maneuvering leg 43 are further designed so that the outermost portion of the maneuvering leg 43 is held in place by the downwards protruding heel 22 and the lower cheek 31 when the joint is assembled.

FIG. 6c mainly corresponds to FIG. 6a-b above. The upper portion of the lower cheek 31 containing lower cheek heal 33, front face 36 and pivot edge $31^I$ is, however, made of a separate material which is joined with the core material with, for example, glue. It is, however, also possible to attach this portion by nailing, prizing or snapping it into position.

FIG. 7a-b shows in cross-section a joint 1 having a first edge 2 and a second edge 3 according to a seventh embodiment of the invention. FIG. 7a shows the joint 1 just before the joining and FIG. 7b shows the joint 1 after assembly. The seventh embodiment is an alternative embodiment of the invention where the joint is assembled through horizontal motion. The joint 1 has a first edge 2 and a second edge 3 wherein the first edge 2 is provided with a tongue 50 and a rear groove 51. The second edge 3 is provided with a lower cheek 61 having a distal end 62, an inner locking groove 63, a tongue groove 64 and a locking member surface 65. A moveable locking member 70 is arranged on the locking member surface 65. The moveable locking member 70 has an inner locking tongue 71, a maneuvering cheek 72 and an outer locking tongue 73. As said above, the second edge 3 is intended to join with the first edge 2 through horizontal motion according to this seventh embodiment of the invention. A maneuvering area 52 beneath the tongue 50 presses on the maneuvering cheek 72 urging the inner locking tongue 71 to move downwards and engage the inner locking groove 63. At the same time, the outer locking tongue 72 will move upwards and engage the rear groove 51.

FIG. 8a-b shows in cross-section a joint 1 having a first edge 2 and a second edge 3 according to an eighth embodiment of the invention. FIG. 8a shows the joint 1 just before the joining and FIG. 8b shows the joint 1 after assembly. The eighth embodiment is an alternative embodiment of the invention where the joint is assembled through horizontal motion. The joint 1 has a first edge 2 and a second edge 3 wherein the first edge 2 is provided with a tongue 50 and a rear depression 53. The second edge 3 is provided with a lower cheek 61 having a distal end 62, an inner locking groove 63 and a tongue groove 64. A moveable locking member 70 is arranged on first edge 2. The moveable locking member 70 has a maneuvering cheek 72 and an outer locking tongue 73. As said above, the second edge 3 is intended to join with the first edge 2 through horizontal motion according to this eighth embodiment of the invention. The outer locking tongue 73 is urged upwards into the rear depression 53 during the assembly. It will then snap down into engagement with inner locking groove 63 once in the fully assembled position.

FIG. 9 shows in cross-section a joint 1 having a first edge 2 and a second edge 3 according to a ninth embodiment of the invention. FIG. 9 shows the joint 1 just before the joining. The ninth embodiment is an alternative embodiment of the invention where the joint is assembled through horizontal motion. The joint 1 has a first edge 2 and a second edge 3 wherein the first edge 2 is provided with a tongue 50 and a rear groove 51. The second edge 3 is provided with a lower cheek 61 having a distal end 62, an inner locking groove 63 and a tongue groove 64. A moveable locking member 70 is arranged on the first edge 2. The moveable locking member 70 has an inner locking tongue 71, a maneuvering cheek 72 and an outer locking tongue 73. As said above, the second edge 3 is intended to join with the first edge 2 through horizontal motion according to this ninth embodiment of the invention. The outer locking tongue 73 and the inner locking tongue 71 are urged upwards during the assembly. The outer locking tongue 73 will then snap down into engagement with inner locking groove 63 once in the fully assembled position.

FIG. 10a-b shows in cross-section a joint 1 having a first edge 2 and a second edge 3 according to a tenth embodiment of the invention. FIG. 10a shows the joint 1 just before the joining and FIG. 10b shows the joint 1 after assembly. The first edge 2 is provided with a distal edge 21 and a downwards protruding heel 22. The distal edge 21 is further provided with an upper joint edge 25 beneath which an undercut space $23^I$ is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut space $23^I$. The moveable locking element 40 has a locking tongue 41, a locking tongue leg 42 also acting as a maneuvering leg 43. The second edge 3 is intended to join with the first edge 2 through vertical motion. The lower cheek heel 33 has a front face 36 while the downwards protruding heel 22 has a rear face 26. The lower cheek heel 33 has a front face 36 while the downwards protruding heel 22 has a rear face 26 and the moveable locking element 40 has a face section 430. The front face 36 and the rear face 26 are intended to interact, having a face section 430 in an intermediate position. The interaction results in the upper joint edge 25 and the upper joining edge 35 being urged together in an assembled joint 1. The locking tongue 41 will engage the undercut 34 when the edges 2 and 3, respectively, are fully assembled.

The invention is not limited by the embodiments shown as they can be varied in different ways within the scope of the invention. It is, for example, possible to use the different embodiments described in combination so that two opposite edges are provided with a joint selected from the herein described embodiments while the remaining edges are provided with another type of joint.

What is claimed is:

1. A joint between floor panels having a first edge and a second edge wherein the first edge is provided with a distal edge and a downwards protruding heel, that the distal edge further is provided with an upper joint edge beneath which a groove is arranged and wherein the second edge is provided with a lower cheek having a distal end at which an upwards protruding lower cheek heel is arranged, that the second edge further is provided with an upper joining edge beneath which an undercut is arranged; and wherein a moveable locking element is arranged in the space created by the undercut, said moveable locking element having a locking tongue, a locking tongue leg and a maneuvering leg, said maneuvering leg comprising proximate and distal edges, said proximate edge connected to said locking leg, and a hinge located between said proximate and distal edges; the hinge causing a cam lock effect on the locking tongue of the movable locking element through the locking tongue leg when the proximate and distal edges of the maneuvering leg are in a substantially coplanar position.

2. A joint according to claim 1, wherein the second edge is shaped to join with the first edge through vertical motion.

3. A joint according to claim 1, wherein the downwards protruding heel presses on the maneuvering leg urging the locking tongue to move forward and engage the groove.

4. A joint according to claim 1, wherein the lower cheek heel has a front face and that the downwards protruding heel has a rear face.

5. A joint according to claim 4, wherein the front face and the rear face are intended to interact, the interaction resulting in the upper joint edge and the upper joining edge being urged together in an assembled joint.

6. A joint according to claim 1, wherein the lower cheek heel has a front face, that the downwards protruding heel has a rear face and that the maneuvering leg has a face section.

7. A joint according to claim 6, wherein the front face and the rear face are intended to interact, having the face section in an intermediate position, the interaction resulting in the upper joint edge and the upper joining edge being urged together in an assembled joint.

8. A joint according to claim 1, wherein the locking element is made of a thermoplastic material.

9. A joint according to claim 1, wherein the locking element is made of a metal.

10. A joint according to claim 1, wherein the locking element is made of a thermosetting material.

11. A joint according to claim 1, wherein the locking element is made of a composite material.

12. A joint according to claim 1, wherein the locking element deforms during joining.

13. A joint according to claim 1, wherein the locking element deforms at the hinge during joining.

14. A joint according to claim 13, wherein the hinge is a living hinge.

15. The joint of claim 1 wherein at least one of said first and second edges are formed for a material selected from the group consisting of medium density fiberboard (MDF), high density fiberboard (HDF), solid wood, and particle board.

* * * * *